Feb. 19, 1952 P. PLANER 2,586,436
WIDE ANGLE OBLIQUE PROJECTION SYSTEM
Filed July 14, 1950

INVENTOR:
Paul Planer,
BY
His Agent.

Patented Feb. 19, 1952

2,586,436

UNITED STATES PATENT OFFICE 2,586,436

WIDE ANGLE OBLIQUE PROJECTION SYSTEM

Paul Planer, New York, N. Y.

Application July 14, 1950, Serial No. 173,795

14 Claims. (Cl. 88—24)

The invention relates to optics, and relates more particularly to wide angle oblique projection systems yielding substantially undistorted images.

The invention is notably suitable for projection of images at close range to the screen, yet covering a wide area thereof, and finds advantageous use in connection with background projection for theatrical, telecast or similar stage purposes, advertising projection, and like uses.

Projection at close distances cannot be carried out with projectors now commonly in use, since the latter do not cover a sufficiently wide angular range. Yet, projection at close proximity affords great advantage over old projection systems.

For instance, present day movie-goers find themselves in a darkened room; the requirement for darkness exists only because the projectors commonly in use have a small projecting angle, and hence have to be placed at a great distance from the screen; this, in turn, owing to the great losses of light at large distances, makes dark surroundings necessary. However, if it were possible to move with the old time projector towards close proximity of the screen, the losses of light would be small and there would be no necessity for darkening the room. If a projector of the type now in use would be moved in proximity to the screen, the resulting image would be much too small for practical purposes. With projectors in accordance with the invention, however, a wide area undistorted image is obtained at close proximity to the screen and, since it allows oblique projection, the projector does not block the view.

The invention is particularly suitable for projecting theatrical scenery from the front. Such projection is characterized by great economy, since it permits the use of small projection slides that are easily transported and stored, instead of the conventional large-scale painted scenery. It also facilitates rapid interchange of sceneries. Oblique projection from the front, only made possible by wide angle and close proximity characteristics furthermore obviates the availability of a large space to the rear of the screen, such as has always been necessary where theatrical scenery projection has been carried out from the rear of the stage.

The projector can be placed above and behind the safety curtain, either centrally or in the wings of either or both sides, and is thus concealed from the view of the audience. The projector is placed outside of the visible stage area and projects a wide angle beam; thereby the possibility is eliminated that the actors might enter into the path of the projected light beam as they move about the stage floor. Since all the well-known features of the art of projection, such as masking, vignetting, or the like, are available for this wide angle projection, there may be obtained quite unusual theatrical scenery and background effects.

Advertising of the outdoor and indoor type is another field well suited for use of projectors in accordance with the invention. The projector can be placed in close proximity to an upright screen or other prepared outdoor surface visibile to observers yielding straight-type projection images without that the projector blocks the view of the observer. Quick change of the projected image, as well as other conventional features of the projection art that may be employed with wide angle projection in a manner similar to projectors commonly used, result in unique advertising principles.

Likewise, the projector of the invention is usable for background projection of scenery for television broadcasting, and also for screen projection in connection with teletype machines that is known under the trade designation "telecon."

In the foregoing there have been referred to some of the uses for the instant invention, and it will be understood that this is not done exhaustively, but only by way of exemplification, and no limitation is intended thereby. Reference is being had to the following publications:

U. S. Patents No. 1,869,275 and No. 1,881,355;

Australian Patent No. 2,703/31;

"Twentieth Century Stage Decoration," by S. J. Hume and W. R. Fuerst, published by Alfred Knopf, Inc., 1927, New York-London, vol. 1, chapter 13, pp. 113–115;

"Stage Lighting," by C. H. Ridge and F. S. Aldred, Pitman & Sons, London, 1935, pp. 100–103;

"The Evolution of Stage Lighting," by L. G. Applebee, Journal of the Royal Society of Arts, London, volume No. 4723, pp. 554–555, August 2, 1946.

Accordingly, the invention has among its objects the provision of a wide angle projector suitable for projecting at close range a large area image onto a screen. A further object of the invention is to provide an objective system for such a projector.

With the above and other objects of the invention in view, the invention consists in the novel construction, arrangement and combination of various devices, elements and parts, as set forth in the claims hereof, certain embodiments of the same being illustrated in the accompanying drawings and described in the specification.

In the accompanying drawings.

Figure 1:
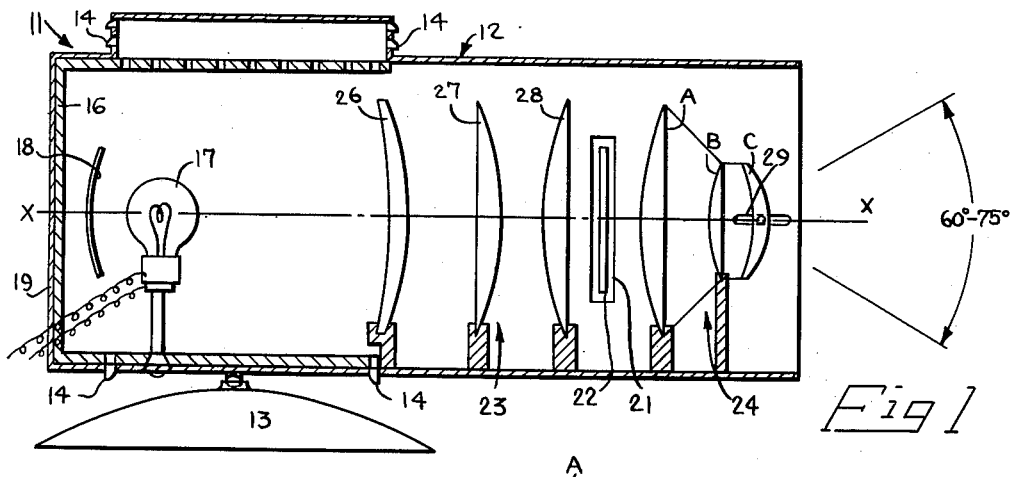
Fig. 1 is a longitudinal sectional diagrammatic view of a projector, in accordance with the invention.

In carrying the invention into effect in the embodiments which have been selected for illustration in the accompanying drawings and for description in this specification, and referring now particularly to Fig. 1, there is provided a projector, generally indicated at 11, that has a casing 12, pivotally mounted on a base 13, to permit swivel movement of the casing.

The casing 12 has louvres 14 near the top and bottom to provide adequate ventilation of the interior and is lined with asbestos at 16. A light source 17 is mounted in said casing; this light source may either be an incandescent lamp having, for instance a power of from 3,000 to 5,000 watts, or may be any other suitable light source, such as an arc lamp.

A concave mirror 18 is provided near the rear wall 19 of the casing 12, and is disposed facing frontwardly, to project light rays frontwardly. A recess 21 is arranged in the casing for receiving and supporting one or more slides 22 for image projection.

Rearwardly of the slide recess 21 there is provided a condenser, generally indicated at 23, and frontwardly of the same there is mounted an objective, generally designated 24.

Figure 4:
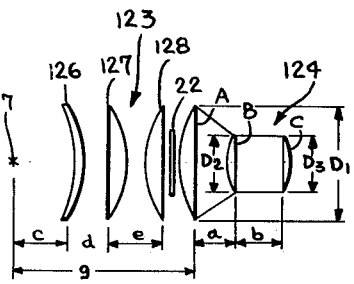
Fig. 4 is a schematic view, similar to Fig. 2, but showing a modification.
Figure 5:
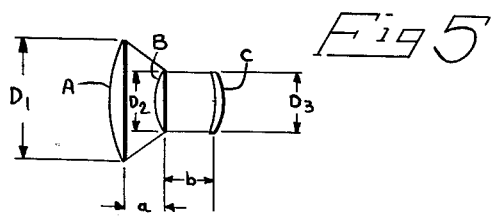
Fig. 5 is a schematic view of a further modified objective.

Broadly speaking there will be found, in the accompanying drawings and in the ensuring description, projectors for two sizes of slides 22, namely for slides measuring 13 x 18 cm. (Figs. 1, 2 and 3) and for slides measuring 8.5 x 10 cm. (Figs. 4 and 5). The former is particularly suitable for background projection for theaters and television studios, while the latter is especially advantageous for advertising projection. It will, however, be well understood by those versed in this and related arts, that this division is mainly made for the purpose of clarification and not in a restrictive sense.

Both type projectors can be brought to a distance of from 1 to 25 m. or more opposite a projection screen; and both have a projection angle of about 60–75°, as best shown in Fig. 1. The terms "rearward" and "frontward" are being used herein to designate the directions from the objective to the light source, and from the light source towards the objective, respectively, but merely for illustrative purposes.

All of the lens components of the condensers as well as of the objectives of the examples described herein, preferably are made of Jenaer Crown glass having a refractory index of 1.5253, and are coated.

In the following examples of objectives, each objective comprises a plurality of lens components, for instance a rear lens component A, an intermediate lens component B, and a front lens component C. Each of these components, though in the illustrations they are not shown corrected for some of the aberrations, may be corrected in accordance with well-known optical principles. Each corrected lens component would, of course, be composed of more than one piece of glass, and the pieces be of different kinds.

The rear lens component A is spaced from the intermediate component B for a distance $a$, and the front lens component C is spaced from the intermediate lens component B for a distance $b$, it being understood that the distances $a$ and $b$ are measured between the optical centers of the lens components involved.

In all the ensuing examples, as will be demonstrated, the front lens component C has a focal length $f_3$ that is from 1.6 to 2.3 times that of the focal length F of the entire objective system, the intermediate lens component B has a focal length $f_2$ that is from 1.6 to 2.5 times that of the focal length F of the objective system, and the rear lens component A has a focal length $f_1$ that is from 3.0 to 4.0 times that of the focal length F of the objective system.

In all the examples, furthermore, the rear lens component A of the objective has at least one convex surface facing rearwardly, the intermediate component B has at least one convex surface facing rearwardly, and the front lens component C has at least one convex surface facing frontwardly. Furthermore, all of the said lens units of the condenser and the components of the objective preferably have a circular circumference, with the rear lens component A of the objective having an outside diameter $D_1$ of at least twice the size of the diameter $D_2$ of the intermediate component B, and also at least twice the size of the diameter $D_3$ of the front lens component C.

As best shown in Fig. 1, there is a mechanism, designated 29, such as a pin and slot arrangement, for permitting movement of the front lens component C between two extreme positions. This permits not only focusing of the image on the screen, but also allows to put a slide out to focus to create special effects particularly useful for theatrical background projection. Thus, while the distance $a$ is fixed, though to a value within the given range, the distance $b$ is variable for the purpose stated.

Figure 2:
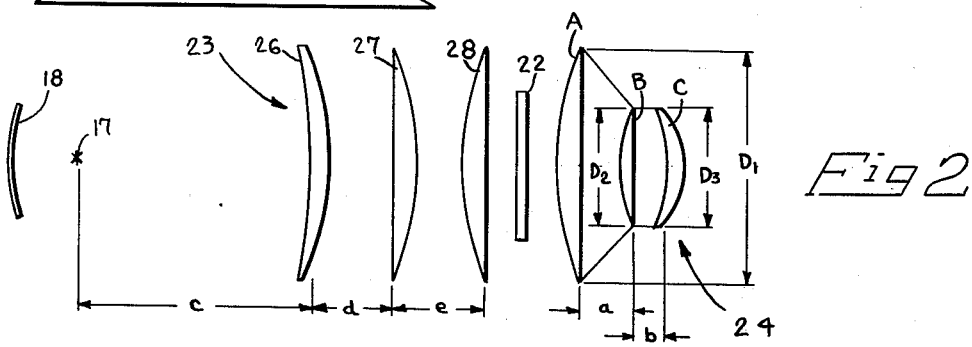
Fig. 2 is a schematic view of the optical elements of an embodiment.

The condenser, as best shown in Figs. 1, 2 and 4, is a so-called "triple" condenser, which means that it is composed of three lens units.

*Projectors for slides 13 x 18 cm.*

In the embodiment shown in Fig. 2, the condenser 23 for the first four of the following examples, comprises a first, rearmost, lens unit 26 that is located opposite the light source 17, a second lens unit 27, and a third lens unit 28 that among the condenser lens units is disposed furthest away from the light source 17 and nearest to the slide recess 21.

The first lens 26 is a meniscus type lens that is convexially facing frontwardly, has a circular contour and an outside diameter of 225 mm. Its optical center is spaced from the center of the light source 17 for a distance $c$ of 250 mm.

The second lens 27 is a plano convex lens, convexially facing frontwardly, that has a circular contour and an outside diameter of 235 mm.; its optical center is spaced from that of the first lens 26 for a distance $d$ of 75 mm.

The third lens 28 is shaped and dimensioned substantially like the second lens 27, but it faces convexially rearwardly, and its optical center is spaced from that of the second lens 27 for a distance $e$ of 95 mm.

In a first example, shown in Fig. 2, the objective 24 and its lens components are characterized by the following value; the lens characteristics are given in focal lengths (cm.) and in focal power (diopters):

Table I

| Name | Symbol—range of value—dimension |
|---|---|
| Focal length of objective system. | $F=11.0$ to 11.6 cm. |
| Rear lens component "A" {diameter, focal length, type of lens} | $D_1=230$ mm. $f_1=36.5$ cm. plano-convex, facing rearwardly. |
| Intermediate lens component "B" {diameter, focal length, focal power, type of lens} | $D_2=115$ mm. $f_2=18.0$ cm. $p_2=+5.4$ diopters. plano-convex, facing rearwardly. |
| Front lens component "C" {diameter, focal length, focal power, type of lens} | $D_3=112$ to 115 mm. $f_3=25.0$ cm. $p_3=\sum\{P_3'=+7.4$ diopters. $P_3''=-3.75$ diopters.$\}$ meniscus type, facing frontwardly. $P_3'$=focal power of the convex surface of the component (C). $P_3''$=focal power of the concave surface of the component (C). |
| Distance between "A" and "B". | $a=50$ to 65 mm. |
| Distance between "B" and "C". | $b=30$ to 75 mm. |
| | $\sum$=the sum of. |

Figure 3:
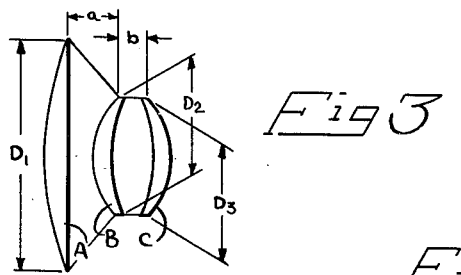
Fig. 3 is a schematic view of a modified objective.

In the second example, for which Fig. 3 is illustrative, the objective and the lens components thereof have the values:

Table II

| Name | Symbol—range of value—dimension |
|---|---|
| Focal length of objective system. | $F=10.0$ to 10.6 cm. |
| Rear lens component "A" {diameter, focal length, type of lens} | $D_1=230$ mm. $f_1=36.5$ cm. plano-convex, facing rearwardly. |
| Intermediate lens component "B" {diameter, focal length, focal power, type of lens} | $D_2=115$ mm. $f_2=17.0$ to 20.0 cm. $p_2=\sum\{P_2'=+8.0$ diopters. $P_2''=-3.0$ diopters.$\}$ meniscus type, facing rearwardly. $P_2'$=focal power of the convex surface of the component (B). $P_2''$=focal power of the concave surface of the component (B). |
| Front lens component "C" {diameter, focal length, focal power, type of lens} | $D_3=112$ to 115 mm. $f_3=17.0$ to 20.0 cm. $p_3=\sum\{P_3'=+8.0$ diopters. $P_3''=-3.0$ diopters.$\}$ meniscus type, facing frontwardly. $P_3'$=focal power of the convex surface of the component (C). $P_3''$=focal power of the concave surface of the component (C). |
| Distance between "A" and "B". | $a=50$ to 65 mm. |
| Distance between "B" and "C". | $b=30$ to 75 mm. |
| | $\sum$=the sum of. |

In a third example, for which Fig. 3 is also illustrative, the objective and its lens components are characterized by values set forth in table III; however, only the focal powers of the lenses are given:

Table III

| Name | Symbol—range of value—dimension |
|---|---|
| Focal length of objective system. | $F=10.0$ to 10.6 cm. |
| Rear lens component "A" {diameter, focal power, type of lens} | $D_1=230$ mm. $p_1=+2.5$ diopters. plano-convex, facing rearwardly. |
| Intermediate lens component "B" {diameter, focal power, type of lens} | $D_2=112$ mm. $p_2=\sum\{P_2'=+7.5$ diopters. $P_2''=-3.0$ diopters.$\}$ meniscus type, facing rearwardly. $P_2'$=focal power of the convex surface of the component (B). $P_2''$=focal power of the concave surface of the component (B). |
| Front lens component "C" {diameter, focal power, type of lens} | $D_3=110$ mm. $p_3=\sum\{P_3'=+7.5$ diopters. $P_3''=-3.0$ diopters.$\}$ meniscus type, facing frontwardly. $P_3'$=focal power of the convex surface of the component (C). $P_3''$=focal power of the concave surface of the component (C). |
| Distance between "A" and "B." | $a=46.5$ mm. |
| Distance between "B" and "C." | $b=44$ to 64 mm. |
| Thicknesses of lens components in optical axis "$x$—$x$" | lens "A"=46.0 mm. lens "B"=18.0 mm. lens "C"=18.0 mm. |
| | $\sum$=the sum of. |

In a fourth example, for which again Fig. 3 is illustrative, the objective and its lens components have the following values:

Table IV

| Name | Symbol—range of value—dimension |
|---|---|
| Focal length of objective system. | $F=10.5$ cm. |
| Rear lens component "A" {diameter, focal power, type of lens} | $D_1=225$ mm. $p_1=+2.5$ diopters. plano-convex, facing rearwardly. |
| Intermediate lens component "B" {diameter, focal power, type of lens} | $D_2=110$ mm. $p_2=\sum\{P_2'=+7.5$ diopters. $P_2''=-3.0$ diopters.$\}$ meniscus type, facing rearwardly. $P_2'$=focal power of the convex surface of the component (B). $P_2''$=focal power of the concave surface of the component (B). |
| Front lens component "C" {diameter, focal power, type of lens} | $D_3=110$ mm. $p_3=\sum\{P_3'=+7.5$ diopters. $P_3''=-3.0$ diopters.$\}$ meniscus type, facing frontwardly. $P_3'$=focal power of the convex surface of the component (C). $P_3''$=focal power of the concave surface of the component (C). |
| Distance between "A" and "B". | $a=46.5$ mm. |
| Distance between "B" and "C". | $b=44$ to 64 mm. |
| | $\sum$=the sum of. |

Projectors for slides 8.5 x 10.0 cm.

In the modification shown in Fig. 4, the condenser 123, which is for the ensuing fifth and sixth examples, is again composed of three lens units. It comprises a first or rearmost meniscus type lens unit 126, that is located opposite the light source 17 and is disposed frontwardly convexially, has a circular circumference and an outside diameter of about 120 mm.; a second lens unit 127, that is plano-convex, having its convex side facing frontwardly and having an outside diameter of about 130 mm.; and a third or frontward lens unit 128, that is plano-convex and faces with its convex side rearwardly and has an outside diameter of about 130 mm. The second and third lens units, 127 and 128, are alike and are disposed symmetrically.

The first lens unit 126 is spaced with its optical center from the light source 17 for a distance c of 55 mm. and is spaced from the optical center of the second lens unit 127 for a distance d of 38 mm. The third lens unit 128 has its optical center spaced from that of the second lens unit 127 for a distance e of 61 mm.

The rear lens component A of the objective 124 has its optical center spaced from the light source 17 for a distance g of 180 mm.

A fifth example of an objective, for which Fig. 4 is illustrative, has values given below in Table V.

*Table V*

| Name | | Symbol—range of value—dimension |
|---|---|---|
| Focal length of objective system. | | $F = 7.2$ cm. |
| Rear lens component "A" | diameter | $D_1 = 120$ mm. |
| | focal length | $f_1 = 25.0$ cm. |
| | type of lens | plano-convex, facing rearwardly. |
| Intermediate lens component "B" | diameter | $D_2 = 55$ mm. |
| | focal length | $f_2 = 17.0$ cm. |
| | type of lens | plano-convex, facing rearwardly. |
| Front lens component "C" | diameter | $D_3 = 53$ to 55 mm. |
| | focal length | $f_3 = 21.5$ cm. |
| | type of lens | plano-convex, facing frontwardly. |
| Distance between "A" and "B" | | $a = 32$ to 48 mm. |
| Distance between "B" and "C" | | $b = 40$ to 60 mm. |

A sixth example of an objective is shown in Fig. 5 and its values are given below in Table VI.

*Table VI*

| Name | | Symbol—range of value—dimension |
|---|---|---|
| Focal length of objective system | | $F = 7.8$ cm. |
| Rear lens component "A" | diameter | $D_1 = 130$ mm. |
| | focal power | $p_1 = +7.0$ diopters. |
| | type of lens | plano-convex, facing rearwardly. |
| Intermediate lens component "B" | diameter | $D_2 = 59$ mm. |
| | focal power | $p_2 = +10.0$ diopters. |
| | type of lens | plano-convex, facing rearwardly. |
| Front lens component "C" | diameter | $D_3 = 57$ mm. |
| | focal power | $p_3 = \sum \begin{cases} P_3' = +14.00 \text{ diopters.} \\ P_3'' = -7.75 \text{ diopters.} \end{cases}$ |
| | type of lens | meniscus type, facing frontwardly. $P_3'$ = focal power of the convex surface of the component (C). $P_3''$ = focal power of the concave surface of the component (C). |
| Distance between "A" and "B" | | $a = 32$ to 48 mm. |
| Distance between "B" and "C" | | $b = 40$ to 60 mm. |
| | | $\sum$ = the sum of. |

In the foregoing six examples of objectives, specific values and ranges have been indicated, but it will be understood that these values also encompass the ratios of the ranges between the extreme values thereof.

It will be apparent to those skilled in the art that the novel principles of the invention disclosed herein in connection with specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent, is as follows:

1. In a wide angle objective system, in combination, a front lens component, a rear lens component, and an intermediate lens component disposed substantially midway between said front and rear lens components and having a diameter substantially of the size of that of said front lens component, said rear lens component having a diameter considerably larger than that of either of the other lens components, said front lens component having a focal length of from 1.6 to 2.3 times that of the system, said rear lens component having a focal length of from 3.0 to 4.0 times that of the system, and said intermediate lens component having a focal length of from 1.6 to 2.5 times that of the system.

2. In a wide angle objective system, in combination, a rear lens component having at least one convex surface facing rearwardly, a front lens component spaced from said rear lens component and having at least one convex surface facing frontwardly, and an intermediate lens component disposed within the inter lens space and having at least one convex surface facing rearwardly, said rear lens component having a diameter of at least twice the size of that of either of the other lens components, said front lens component having a focal length of from 1.6 to 2.3 times that of the system, said rear lens component having a focal length of from 3.4 to 4.0 times that of the system, and said intermediate lens component having a focal length of from 1.6 to 2.5 times that of the system.

3. In a wide angle projector, for use in close proximity to a reflection surface, in combination: a light source; a condenser assembly comprising three lens-units spaced from each other and including a rear unit having a frontal convex surface, a center unit having a frontal convex surface, and a front unit having a rearward convex surface; and an objective system including a front lens component, a rear lens component, and an intermediate lens component spaced from said front and rear lens components, said front lens component having a focal length of from 1.6 to 2.3 times that of the system, said rear lens component having a local length of from 3.0 to 4.0 times that of the system, and said intermediate lens component having a focal length of from 1.6 to 2.5 times that of the system.

4. In a wide angle projector, for use in close proximity to a reflection surface, in combination: a light source; a condenser assembly comprising three lens-units spaced from each other and including a meniscus type rear unit disposed convexially frontwardly, and two oppositely facing plano convex units; and an objective system including a front lens component, a rear lens component, and an intermediate lens component spaced from said front and rear lens components, said front lens component having a focal length of from 1.6 to 2.3 times that of the system, said rear lens component having a local length of from 3.0 to 4.0 times that of the system, and said intermediate lens component having a focal length of from 1.6 to 2.5 times that of the system.

5. In a wide angle projector, as claimed in claim 4, characterized therein that the diameter of said condenser units being at least as large as the diameter of said rear lens component and the latter having at least twice the size of the diameter of said other two lens components.

6. In a wide angle objective system, in combination: a plano convex rear lens component positioned rearwardly convexially and having a diameter $D_1$ and a focal length $f_1$; an intermediate plano convex lens component disposed rearwardly convexially and being spaced from said rear lens component for a distance $a$ and having a diameter $D_2$ and a focal length $f_2$; and a meniscus type front lens component being frontwardly convexially and being spaced from said intermediate lens component for a distance $b$ and having a diameter $D_3$ and a focal length $f_3$; said lens components having a refractory index $n$ and being so arranged that said system will have a focal length $F$; wherein $F$ is from 11.0 to 11.6 cm.
$D_1$ is 230 mm.
$f_1$ is 36.5 cm.
$D_2$ is 115 mm.
$f_2$ is 18.0 cm.
$a$ is from 50 to 65 mm.
$D_3$ is from 112 to 115 mm.
$f_3$ is 25.0 cm.
$b$ is from 30 to 75 mm.
$n$ is 1.5253.

7. In a wide angle objective system, in combination: a plano convex rear lens component positioned rearwardly convexially and having a diameter $D_1$ and a focal length $f_1$; an intermediate meniscus type lens component disposed rearwardly convexially and being spaced from said rear lens component for a distance $a$ and having a diameter $D_2$ and a focal length $f_2$; and a meniscus type front lens component being frontwardly convexially and being spaced from said intermediate lens component for a distance $b$ and having a diameter $D_3$ and a focal length $f_3$; said lens components having a refractory index $n$ and being so arranged that said system will have a focal length $F$; wherein $F$ is from 10.0 to 10.6 cm.
$D_1$ is 230 mm.
$f_1$ is 36.5 cm.
$D_2$ is 115 mm.
$f_2$ is from 17.0 to 20.0 cm.
$a$ is 50 to 65 mm.
$D_3$ is from 112 to 115 mm.
$f_3$ is from 17.0 to 20.0 cm.
$b$ is from 30 to 75 mm.
$n$ is 1.5253.

8. In a wide angle objective system, in combination: a plano-convex rear lens component positioned rearwardly convexially and having a diameter $D_1$ and a focal power $p_1$; an intermediate meniscus type lens component disposed rearwardly convexially and being spaced from said rear lens component for a distance $a$ and having a diameter $D_2$ and a focal power $p_2$ being the sum of a focal power $P_2'$ of the convex surface and a focal power of $P_2''$ of the concave surface; and a meniscus type front lens component being frontwardly convexially and being spaced from said intermediate lens component for a distance $b$ and having a diameter $D_3$ and a focal power $p_3$ being the sum of a focal power $P_3'$ of the convex surface and a focal power $P_3''$ of the concave surface; said lens components having a refractory index $n$ and being so arranged that said system will have a focal length $F$; wherein $F$ is from 10.0 to 10.6 cm.
$D_1$ is 230 mm.
$p_1$ is +2.5 diopters.
$D_2$ is 112 mm.
$p_2$ is the sum $$\Sigma \begin{cases} P_2' = +7.5 \text{ diopters} \\ P_2'' = -3.0 \text{ diopters} \end{cases}$$

$a$ is 46.5 mm.
$D_3$ is 110 mm.
$p_3$ is the sum $$\Sigma \begin{cases} P_3' = +7.5 \text{ diopters} \\ P_3'' = -3.0 \text{ diopters} \end{cases}$$

$b$ is from 44 to 64 mm.
$n$ is 1.5253.

9. In a wide angle objective system, in combination: a plano-convex rear lens component positioned rearwardly convexially and having a diameter $D_1$ and a focal power $p_1$; an intermediate meniscus type lens component disposed rearwardly convexially and being spaced from said rear lens component for a distance $a$ and having a diameter $D_2$ and a focal power $p_2$ being the sum of a focal power $P_2'$ of the convex surface and a focal power of $P_2''$ of the concave surface; and a meniscus type front lens component being frontwardly convexially and being spaced from said intermediate lens component for a distance $b$ and having a diameter $D_3$ and a focal power $p_3$ being the sum of a focal power $P_3'$ of the convex surface and a focal power $P_3''$ of the concave surface; said lens components having a refractory index $n$ and being so arranged that said system will have a focal length $F$; wherein $F$ is 10.5 cm.
$D_1$ is 225 mm.
$p_1$ is +2.5 diopters.
$D_2$ is 110 mm.
$p_2$ is the sum $$\Sigma \begin{cases} P_2' = +7.5 \text{ diopters} \\ P_2'' = -3.0 \text{ diopters} \end{cases}$$

$a$ is 46.5 mm.
$D_3$ is 110 mm.
$p_3$ is the sum $$\Sigma \begin{cases} P_3' = +7.5 \text{ diopters} \\ P_3'' = -3.0 \text{ diopters} \end{cases}$$

$b$ is from 44 to 64 mm.
$n$ is 1.5253.

10. In a wide angle objective system, in combination: a plano-convex rear lens component positioned rearwardly convexially and having a diameter $D_1$ and a focal length $f_1$; an intermediate plano convex lens component disposed rearwardly convexially and being spaced from said rear lens component for a distance $a$ and having a diameter $D_2$ and a focal length $f_2$; and a plano convex type front lens component being frontwardly convexially and being spaced from said intermediate lens component for a distance $b$ and having a diameter $D_3$ and a focal length $f_3$; said lens components having a refractory index $n$ and being so arranged that said system will have a focal length $F$; wherein $F$ is 7.2 cm.
$D_1$ is 120 mm.
$f_1$ is 25.0 cm.
$D_2$ is 55 mm.
$f_2$ is 17.0 cm.
$a$ is from 32 to 48 mm.
$D_3$ is from 53 to 55 mm.
$f_3$ is 21.5 cm.
$b$ is from 40 to 60 mm.
$n$ is 1.5253.

11. In a wide angle objective system, in combination: a plano-convex rear lens component positioned rearwardly convexially and having a diameter $D_1$ and a focal power $p_1$; an intermediate plano convex lens component disposed rearwardly convexially and being spaced from said rear lens component for a distance $a$ and having a diameter $D_2$ and a focal power $p_2$; and a meniscus type front lens component being frontwardly convexially and being spaced from said intermediate lens component for a distance $b$ and having a diameter $D_3$ and a focal power $p_3$ being the sum of a focal power $P_3'$ of the convex surface and a focal power $P_3''$ of the concave surface; said lens components having a refractory index $n$ and being so arranged that said system will have a focal length F; wherein F is 7.8 cm.
$D_1$ is 130 mm.
$p_1$ is +7.0 diopters.
$D_2$ is 59 mm.
$p_2$ is +10.0 diopters.
$a$ is from 32 to 48 mm.
$D_3$ is 57 mm.
$p_3$ is the sum $$\Sigma \begin{cases} P_3' = +14.00 \text{ diopters} \\ P_3'' = -7.75 \text{ diopters} \end{cases}$$

$b$ is from 40 to 60 mm.
$n$ is 1.5253.

12. In a wide angle projector, the combination with a light source and a condenser assembly near said source, of an objective system including a front lens component, a rear lens component, and an intermediate lens component spaced from said front and rear lens components, said front lens component having a focal length of from 1.6 to 2.3 times that of the system, said rear lens component having a focal length of from 3.0 to 4.0 times that of the system, and said intermediate lens component having a focal length of from 1.6 to 2.5 times that of the system.

13. In a wide angle projector, for use in connection with a light source and a condenser near said source, in combination, an objective system comprising a front lens component, a rear lens component, and an intermediate lens component disposed substantially midway between said front and rear lens components, said front lens component having a focal length of from 1.6 to 2.3 times that of the system, said rear lens component having a focal length of from 3.0 to 4.0 times that of the system, and said intermediate lens component having a focal length of from 1.6 to 2.5 times that of the system.

14. In a wide angle objective system, for use in connection with a projector having a light source and a triple condenser near said source, in combination, a front lens component, a rear lens component, and an intermediate lens component disposed substantially midway between said front and rear lens components, said front lens component having a focal length of from 1.6 to 2.3 times that of the system, said rear lens component having a focal length of from 3.0 to 4.0 times that of the system, and said intermediate lens component having a focal length of from 1.6 to 2.5 times that of the system.

PAUL PLANER.

REFERENCES CITED

The following references are of record in the file of this patent:

UNITED STATES PATENTS

| Number | Name | Date |
|---|---|---|
| 1,863,099 | Bowen | June 14, 1932 |
| 1,881,355 | Ceyling et al. | Oct. 4, 1932 |
| 1,955,850 | Hallett et al. | Apr. 24, 1934 |
| 1,996,054 | Bowen | Apr. 2, 1935 |
| 2,215,271 | May | Sept. 17, 1940 |
| 2,313,460 | Warmisham | Mar. 9, 1943 |
| 2,502,544 | Warmisham | Apr. 4, 1950 |